No. 645,267. Patented Mar. 13, 1900.
S. LOUNSBERRY & W. J. WINN.
BICYCLE.
(Application filed June 10, 1899.)
(No Model.)
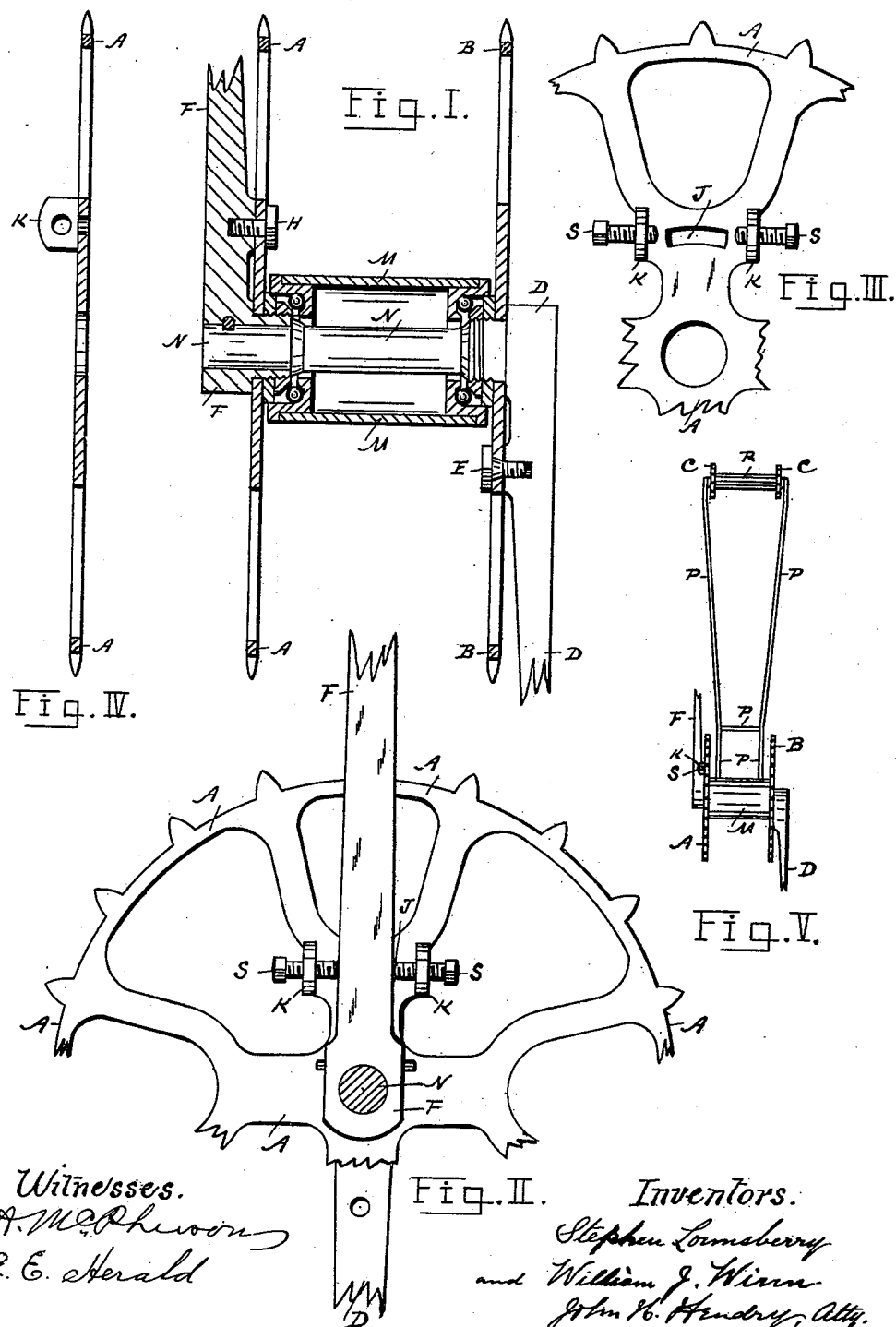

UNITED STATES PATENT OFFICE.

STEPHEN LOUNSBERRY AND WILLIAM J. WINN, OF MILTON, CANADA.

BICYCLE.

SPECIFICATION forming part of Letters Patent No. 645,267, dated March 13, 1900.

Application filed June 10, 1899. Serial No. 720,020. (No model.)

*To all whom it may concern:*

Be it known that we, STEPHEN LOUNSBERRY and WILLIAM J. WINN, citizens of Canada, residing at Milton, in the county of Halton and Province of Ontario, Canada, have invented certain new and useful Improvements in Bicycles; and we do hereby declare the following to be a full, clear, and exact description of the invention, such as will enable others skilled in the art to which it appertains to make and use the same.

Our invention relates to improvements in the driving mechanism of bicycles in which double driving sprocket-wheels are introduced, one sprocket-wheel at each side of the crank-hanger and securely fastened to their respective cranks, and one of the said sprocket-wheels being capable of adjustment to and in line with the secured sprocket-wheel in order that both of the said side sprocket-wheels, the rear sprocket-wheels, and their connecting-chains shall have equal pressure and strain when driving the rear ground-wheel; and the objects of our improvements are, first, to construct a bicycle provided with double driving sprocket-wheels front and rear in order to prevent all side spring and strain of the lower brackets of the bicycle-frame; second, to equalize the pressure on all the bearings; third, to obtain satisfactory results from the power expended; fourth, to provide a bicycle with the sprocket-wheels having equal tension and power on the chains, regardless of the amount of pressure used on the pedals, and, fifth, to prevent any side swaying on the frame-tubes, and therefore more easy to ride and more durable. We attain these objects by the mechanism illustrated in the accompanying drawings, in which—

Figure 1 is a sectional end elevation of the double sprocket-wheels connected to the crank-hanger and cranks of a bicycle. Fig. 2 is a side elevation of the adjustable sprocket-wheel with crank in position and broken. Fig. 3 is a side elevation of the same, the crank being removed. Fig. 4 is a sectional elevation of the adjustable sprocket detached, and Fig. 5 is a very reduced plan of the front and rear sprocket-wheels with cranks and connected by the lower part of the bicycle-frame.

Similar letters refer to similar parts throughout the several views.

In the drawings the adjustable sprocket-wheel is indicated by A, the opposite sprocket-wheel on the same axle by B, and the rear sprockets by C and C. This sprocket A is capable of adjustment to and in proper position and line with the sprocket B in order that the sprocket-chains may have equal strain and tension on the chains of the bicycle, which is important.

The crank D is rigidly fixed to the sprocket B by means of the screw E, and the sprocket A is adjustably fixed to the removable crank F by means of the screw H, which passes through a slotted hole J in said sprocket. This slot is concentric with the sprocket to allow the screw H to find its proper place in the crank when the sprocket is adjusted to position with the sprocket B for the purposes set forth. When this sprocket A is adjusted to proper position by means of the adjusting-screws S, the screw H is then tightened and the sprocket remains rigidly fixed to the crank F, the two adjusting-screws S being also screwed to position against the sides of the crank, which is now held securely, notwithstanding the slotted hole J. The side flanges or lugs K form a part of the sprocket A, and it is necessary that they be wider apart than the width of the crank to allow the sprocket to be adjusted or slightly turned toward the front or toward the rear, as the case may be, to suit its chain, so that the chains on each may operate in harmony and in uniformity in order to attain the objects set forth. This is accomplished by means of the adjustment of one sprocket-wheel one way or the other until the same has equal tension and power on its chain as the opposite sprocket-wheel has on its chain. Without this adjustment it is possible and it is found that one of the two chains may be doing all the work, while the opposite chain may be running without driving in the least. A fiftieth or even a hundredth part of an inch in the adjustment will make quite a difference in the result. It is not necessary that the teeth of each sprocket should be opposite; but it is absolutely necessary that the adjustment should be such that the two chains shall have equal tension, strain, and power when driving, even though one pedal may be worked harder than the other. Hence the utility of the adjustment is to bring the teeth of the adjustable sprocket to bear upon its chain exactly at the same time, and therefore with equal pressure, as the opposite sprocket. The particular construction of the crank-hanger M, with its ball-bearings and cones, we do not specially desire to claim, nor, in fact, the crank D, as a part of the axle N, nor the particular construction of the bicycle-frame P as connected to the said hanger M and to the hub R of the said rear sprocket-wheels and of the rear ground-wheel. It will be observed that the said adjustment of the sprocket A may be accomplished without resorting to the removal of the removable crank F. All that is necessary is to slightly loosen the screw H and then adjust the adjusting-screws S to position against a side of the crank until a satisfactory position of the adjustable sprocket-wheel A in relation to the fixed sprocket-wheel B is attained. The side adjusting-screws S and the inner screw H may then be firmly tightened to position. The sprocket-wheel is then rigid with the crank. These double-sprocket driving-wheels, one of which being capable of rotary adjustment, are very important to give the desired results and objects set forth.

Various changes in the design of the sprocket-wheel and in the sizes and proportions herein illustrated may be made without departing from the spirit and scope of our invention.

Hence what we claim as our invention, and desire to secure by Letters Patent, is—

In a bicycle, driving sprocket-wheels, cranks on the axle of the sprocket-wheels, said sprocket-wheels secured to the inner sides of said cranks, rear sprocket-wheels in line with said driving sprocket-wheels, a concentric slot in one of said driving sprocket-wheels, one of said cranks removable, a screw to pass through said slot and into the removable crank to secure the sprocket-wheel to the crank, lugs on the slotted sprocket-wheel and at each side of the removable crank and screws through said lugs to engage the sides of said removable crank to rotarily adjust the sprocket-wheel, as described.

In testimony whereof we affix our signatures in presence of two witnesses.

STEPHEN LOUNSBERRY.
WILLIAM J. WINN.

Witnesses:
  G. E. McCRANEY,
  W. J. DEWOR.